United States Patent [19]

Chambers et al.

[11] 4,078,839
[45] Mar. 14, 1978

[54] CARRYING HANDLE AND LIFTING DEVICE FOR FLOWER POTS

[76] Inventors: Douglas L. Chambers, Box 252, Howard, Colo. 81233; Ralph E. Squire, Box 44, Gunnison, Colo. 81230

[21] Appl. No.: 805,969

[22] Filed: Jun. 13, 1977

[51] Int. Cl.² .............................................. B66C 1/48
[52] U.S. Cl. .................................. 294/31 R; 47/1 R; 294/16; 294/104
[58] Field of Search ..... 294/3, 15, 16, 17, 27 R–31 R, 294/62, 63 B, 90–92, 101, 103 R, 104; 47/1 R; 224/45 R, 45 F, 45 P

[56] References Cited

U.S. PATENT DOCUMENTS

| | | | |
|---|---|---|---|
| 1,219,726 | 3/1917 | Gray | 294/3 |
| 1,342,758 | 6/1920 | Puchazchevski | 294/31 R |
| 1,657,100 | 1/1928 | Wilson et al. | 294/15 |
| 2,708,592 | 5/1955 | Dalkranian | 294/31 R |
| 2,851,300 | 9/1958 | Thayer | 294/104 |
| 3,253,850 | 5/1966 | Trusty | 294/16 |
| 3,333,883 | 8/1967 | Kikuchi | 294/31 R X |

*Primary Examiner*—Johnny D. Cherry
*Attorney, Agent, or Firm*—Ralph F. Crandell

[57] ABSTRACT

A lifting and carrying device for flower pots is formed by a generally vertical main support post or bar with a pot supporting member at its lower end and a pair of gripping jaws actuated by a lifting and carrying handle pivotally secured to the upper end of the post. The jaw mechanism is formed by a fixed jaw on the post for engaging the upper rim of the pot on the outside surface and an inner jaw swingably mounted on the post and actuated by a linkage mechanism connected to the handle for engaging the upper rim of the pot on the inside surface. As the handle is lifted, the jaws grip the upper rim of the pot and the pot is lifted for carrying.

2 Claims, 4 Drawing Figures

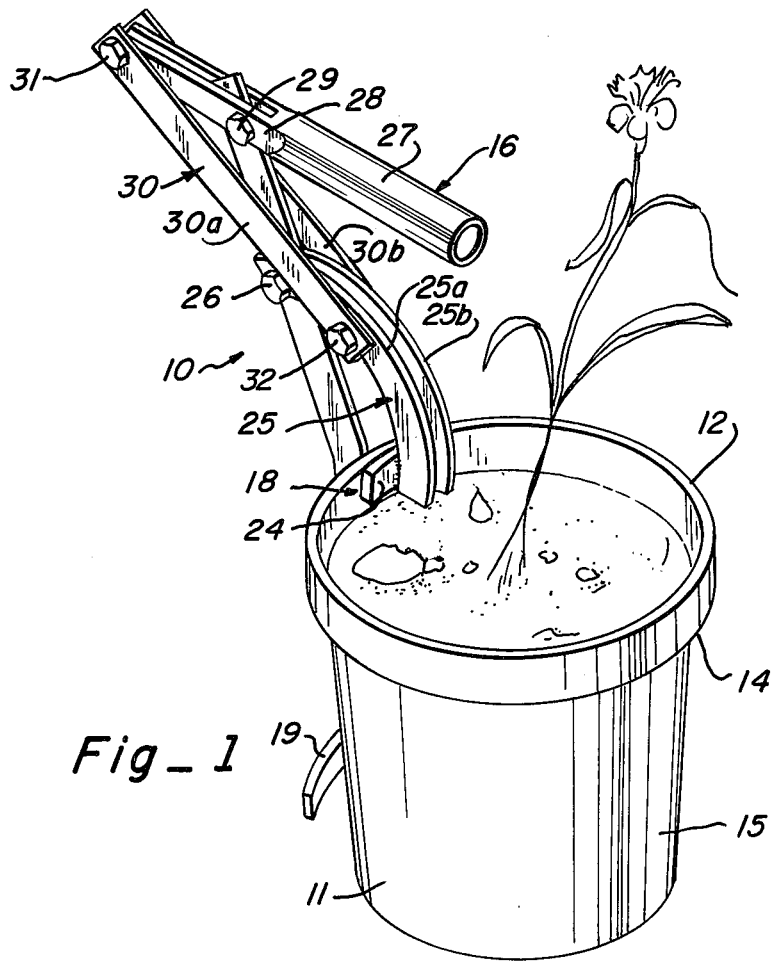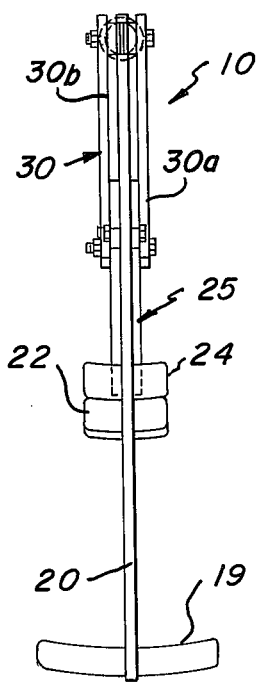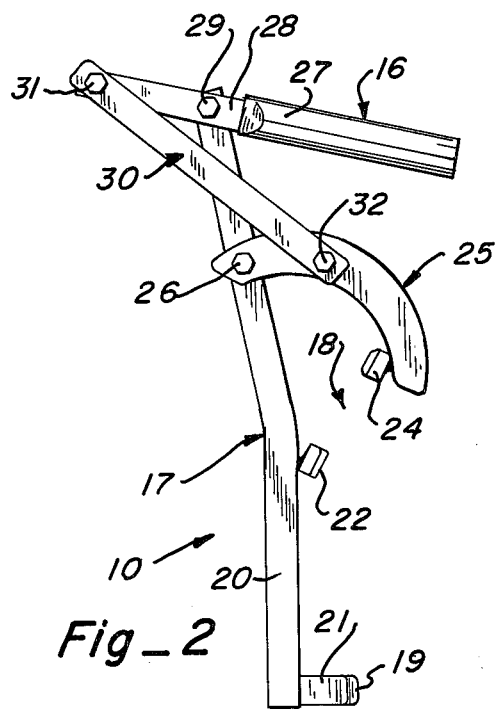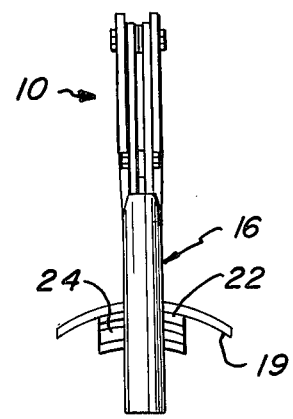
Fig_1
Fig_2
Fig_3
Fig_4

CARRYING HANDLE AND LIFTING DEVICE FOR FLOWER POTS

The present invention relates to a carrying handle and lifting device for flower pots.

In the nursery and florist business, it is necessary to lift and carry large, heavy flower pots. In many instances, the flower pots contain a large plant. Such pots are heavy and difficult to lift, particularly when the pot is sitting on the ground and it is desired to lift it and move it to another location or place it on a table or rack.

It is the principal object of the present invention to provide an improved carrying handle and lifting device for flower pots which enables the user to grasp and lift the pot from a ground position and carry the same to another location.

Another object of the present invention is to provide a carrying handle and lifting device for flower pots of the foregoing character which can be quickly and easily attached to a flower pot and which, when so attached, securely engages the pot to prevent the same from being dropped or damaged.

A further object of the present invention is to provide a carrying handle and lifting device of the foregoing character which can be readily and quickly engaged with or disengaged from a flower pot even when the pot contains a growing plant.

Still a further object of the present invention is to provide a carrying handle and lifting device of the foregoing type which, when engaged with a flower pot, extends sufficiently above the pot to reduce the possibility of damage to a growing plant contained within the pot.

Other objects and advantages of the present invention will become apparent as the following description proceeds, taken in conjunction with the accompanying drawings.

SUMMARY OF THE INVENTION

Briefly, the objects of the invention are realized by providing a flower pot carrying device which includes means for securely gripping the pot together with a handle which both actuates the gripping means and provides a carrying handle for lifting and transporting the pot. To this end, the lifting and carrying device is formed by a generally vertical post or bar provided at its lower portion with means for engaging the flower pot, and at its upper portion being pivotally secured intermediate the ends of a generally horizontal handle lever. The handle lever is provided with a handle grip on the end thereof generally overlying the flower pot, and at its opposite end the handle lever is pivotally engaged with a depending actuating link pivoted in turn at its opposite end to a gripping arm or jaw arm. The gripping arm is in turn pivoted at one end to the vertical bar intermediate the ends thereof and is provided at its opposite end with a gripping plate or jaw adapted to engage with the inner upper peripheral edge portion of a flower pot. In juxtaposed relation with the gripping jaw on the gripping arm, the bar is provided with a fixed jaw adapted to engage with the outer rim surface of a flower pot. By lifting the gripping handle, the jaws are urged together to grip the upper rim portion of a flower pot. At its lowest extremity, the vertical bar is provided with an arcuate support plate adapted to engage the outer pot wall and support the flower pot near the bottom thereof.

When the carrying and lifting device is engaged with a flower pot, the handle serves as a lifting and carrying handle. Being positioned generally centrally of the flower pot, the carrying handle and lifting device as a whole serves to balance the flower pot while it is being carried. The handle extends generally toward the center of the pot and in this manner, undue tipping of the pot with the attendant loss of dirt or materials therein is avoided. Further, because the main post or bar extends upwardly above the pot, the handle is positioned in spaced relation above the pot thereby reducing the possibility of damage to flowers or plants contained within the pot being lifted and carried.

DESCRIPTION OF THE DRAWINGS

FIG. 1 is a perspective view of a flower pot lifting and carrying device embodying the present invention in association with a pot containing a plant.

FIG. 2 is a vertical side elevation view of the lifting and carrying device embodying the present invention.

FIG. 3 is a rear elevation view of the lifting and carrying device embodying the present invention.

FIG. 4 is a top plan view of a lifting and carrying device embodying the present invention.

DESCRIPTION OF THE PREFERRED EMBODIMENT

A lifting and carrying device 10 embodying the present invention is shown in FIG. 1 in lifting and carrying engagement with a flower pot 11. The device 10 supports the flower pot 11 adjacent its lower edge or base and grips the pot adjacent the upper rim 12. The rim 12 conventionally provides an overhanging lip or shoulder 14 overlying the sidewall of the pot.

For purposes of lifting and carrying the pot, the lifting device 10 includes a handle 16 which actuates and clamps a jaw mechanism 18 which in turn engages the rim of the flower pot. The lifting device 10 further includes a lower supporting member 19 which supports the pot by engaging the wall 15 at a point adjacent the base of the pot. As shown in FIG. 2, the lifting and carrying device is formed with a generally vertical post or bar 20 formed from a solid, flat bar which is slightly bent or angled intermediate its ends in an outwardly inclined, obtuse angle 17. At its lower end, the bar 20 carries the supporting member 19, which is generally arcuate in shape, and to conform to the outer surface of the pot is secured to the lower end of the post by an arm 21 which extends from the bar towards the pot.

For gripping the pot to lift and carry the same, the jaw mechanism 18 is formed by a fixed jaw member 22 secured to the bar 20 at a point intermediate the ends thereof and just below the obtuse angle. Cooperating with the fixed jaw member is a moveable jaw member or gripping plate 24 carried on the free end of a generally arcuate gripping arm 25 which is pivoted at its opposite end by a pivot pin 26 to the main post or bar 20. The arcuate gripping arm 25 as shown is formed by a pair of arcuate members 25a, 25b pivoted on opposite sides of the main bar 20. A single solid arcuate arm bifurcated for pivoted engagement with the bar 20 could likewise be utilized. The arcuate gripping arm 25 is pivotally engaged with the main support bar at a point intermediate the obtuse angle 17, and the upper end thereof. With this configuration, swinging the moveable arcuate jaw member 25 and the jaw 24 carried thereby towards and away from the fixed jaw 22, a flower pot can be appropriately gripped or released. The jaw members 22, 24 are desirably generally arcuate to correspond approximately in shape to the curvature of the pot surface to be engaged.

For purposes of operating the moveable gripping arm 25, thereby to actuate the jaws 22, 24 into gripping or releasing engagement with a pot, the handle 16 is formed by a handle lever 28 pivotally engaged intermediate its ends by a pivot pin 29 to the upper end of the bar 20. The handle lever is bifurcated, or provided with a pivot slot for receiving the upper end of the main support bar 20. The handle 16 is formed by a grip 27 secured on the handle lever 28 at the end thereof overlying the jaw mechanism, while the opposite end of the handle lever 28 is pivotally secured to a link 30 by a pivot pin or bolt 31. The link 30 is in turn pivotally engaged by a pivot pin 32 to the arcuate gripping arm 25 at a point thereon intermediate the pivot pin 26 and the moveable gripping jaw 24. The link 30 is formed by a pair of link members 30a, 30b pivoted on opposite sides of the handle lever 28 and arcuate arm 25.

It will be appreciated that, by lifting on the handle grip 27, the handle arm 28 is swung to move the actuating link 30 generally downwardly thereby to swing the arcuate gripping arm 25 and the jaw 24 carried thereby towards the fixed jaw 22 on the main support post or bar 20. When the pot support 19 is positioned against the side wall of a flower pot with the fixed jaw 22 under the pot lip 14 or against the pot rim, by lifting on the handle 16, the moveable jaw 24 is positioned so that the jaws 22, 24 tightly engage and grip the rim of the flower pot. The pot can then be lifted and carried, utilizing the handle for this purpose. To release the pot from the carrying device, the pot is simply placed on a supporting surface, the handle 16 moved downwardly to release the jaws 22, 24 and the lifting and carrying device disengaged from the flower pot.

The device is simple and easy to use and yet sufficiently rugged for lifting heavy pots with plants therein. The support bar 20 extends upwardly above the rim of the pot so that the handle 16 is positioned well above the pot and jaws. In this manner, the handle can be utilized with a minimum of interference with a growing plant in the pot. The obtuse angle formed by the support bar leans away from a pot being carried again further reducing the likelihood of damage to plants contained within the pot being lifted and carried.

While one illustrative embodiment of the present invention has been shown in the drawings and described above in considerable detail, it should be understood that there is no intention to limit the invention to the specific formed disclosed. On the contrary, the intention is to cover all modifications, alternative constructions, equivalents and uses falling within the spirit and scope of the invention as expressed in the appended claims.

I claim as my invention:

1. A lifting and carrying device for flower pots comprising: a main support bar; an arcuate support member secured to the lower end of the support bar for engaging and supporting the outer wall of the pot to be lifted near the base thereof; a fixed jaw member secured to the bar intermediate the ends thereof for engaging the outer wall of the pot near the upper rim thereof; a swingable downwardly curved arcuate jaw arm pivotally secured at one end to the main support bar at a point thereon between the fixed jaw and the upper end of the bar for swinging movement in a vertical plane and adapted to extend in overlying relation to a pot to be lifted and carried; a moveable jaw member supported on the free end of said swingable arcuate jaw arm for engaging the inner wall of the pot near the upper rim thereof in gripping juxtaposition with the fixed jaw for gripping and lifting the pot; a lifting lever pivotally secured intermediate its ends to the upper end of the bar for swinging movement in a vertical plane, one end portion of said lifting lever defining a handle extending in overlying relation to the swingable arcuate jaw arm; a link pivotally secured between the other end portion of said lifting lever and a point intermediate the ends of said arcuate jaw arm for swinging said arcuate jaw arm and the jaw carried thereby downwardly in response to an upwardly swinging movement of said handle and for raising said swingable arcuate jaw arm upwardly in response to a downward movement of said handle; whereby a flower pot can be engaged for lifting and carrying by positioning the arcuate support member adjacent the lower wall of the pot with the fixed jaw member adjacent the upper rim of the pot with the swinging jaw arm extending over and downwardly into the interior of the pot, and lifting on the carrying handle to grip the upper rim portion of the pot between the jaws thereby securely engaging the same for lifting and carrying the flower pot.

2. A lifting and carrying device for flower pots as defined in claim 1 wherein said main support bar includes an obtuse angle at approximately the mid point thereof so that the upper portion of said support bar extends outwardly away from the pot when the pot is engaged by the lifting and carrying device.

* * * * *